F. G. RATHSAM.
CLUTCH.
APPLICATION FILED OCT. 14, 1912.
1,088,723.
Patented Mar. 3, 1914.
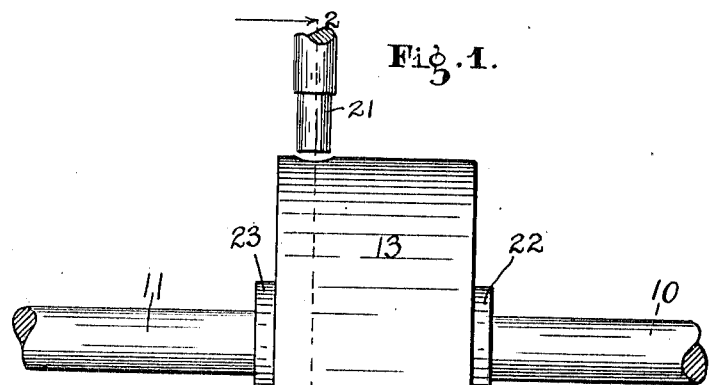
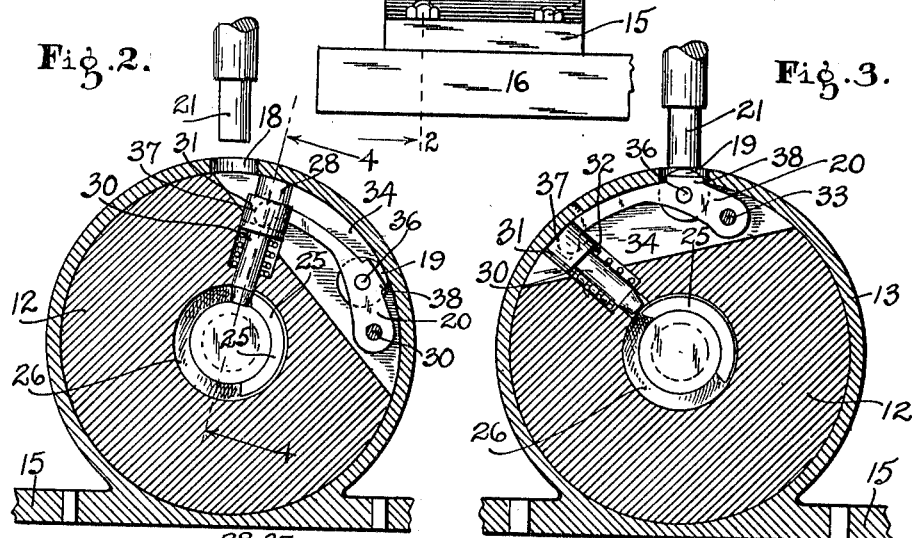
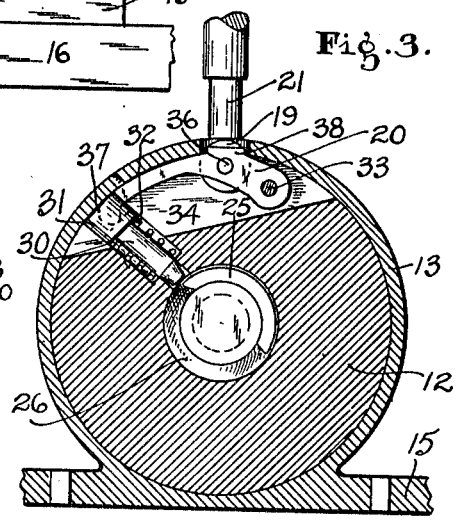
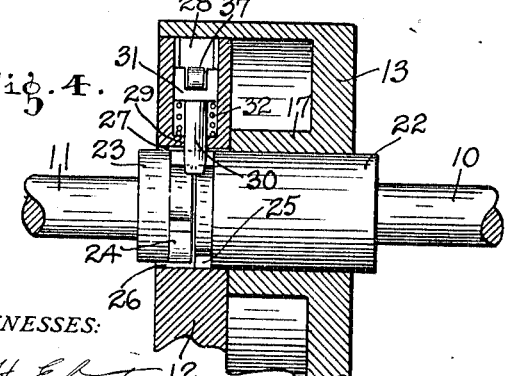
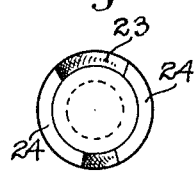
WITNESSES:
A. H. Edgerton
O. M. McLaughlin
INVENTOR.
FRANK G. RATHSAM.
BY
V. H. Lockwood
ATTORNEY.

UNITED STATES PATENT OFFICE.

FRANK G. RATHSAM, OF INDIANAPOLIS, INDIANA.

CLUTCH.

1,088,723.  Specification of Letters Patent.  Patented Mar. 3, 1914.

Application filed October 14, 1912. Serial No. 725,663.

*To all whom it may concern:*

Be it known that I, FRANK G. RATHSAM, a citizen of the United States, and a resident of Indianapolis, county of Marion, and State of Indiana, have invented certain useful Improvements in Clutches; and I do hereby declare that the following is a full, clear, and exact description thereof, reference being had to the accompanying drawings.

The object of this invention is to provide an improved clutch for use on machines in which it is desirable to throw the driven member into gear with the driving mechanism and have it automatically thrown out of gear after a single revolution of the driver.

The chief feature of the invention lies in the use of a rotatable member located within the stationary member, together with suitable operative means on the rotatable member, having a portion thereof extending into the stationary member when it is in idle position and adapted when moved within the stationary member to throw the driven member into gear with the driving member and to automatically throw it out of gear with the same after the driving member has made one complete revolution.

The nature of the invention will be understood from the accompanying drawings and the following description and claims.

Figure 1 is a side elevation of my invention. Fig. 2 is a vertical transverse section on the line 2—2 of Fig. 1 and showing the parts in their operative positions. Fig. 3 is the same as Fig. 2 but with the parts in their idle positions. Fig. 4 is a section on the line 4—4 of Fig. 2. Fig. 5 is an elevation of the driven shaft.

In detail there is shown in the drawings a clutch mechanism having a driving shaft 10 and a driven shaft 11 with their ends adjoining within a rotatable member 12 which lies within a member 13 secured to some stationary portions by means of bolts 14 extending through flanges 15 together with suitable operating mechanism, hereafter described, for causing the inter-locking of the driving and driven members.

The casing 13 is circular in outline and carries the flanges 15 heretofore mentioned, which are secured to the stationary member 16 by means of the bolts 14. The outer portion of said casing is annular and surrounds the rotatable member 12 and there is a central inwardly projecting sleeve 17 surrounding a portion of the driving shaft 10 and against the end of which said rotatable member bears. Upon the upper side as shown in Fig. 1 a hole 18 is cut into which the roller 19 upon the operating lever 20 is adapted to extend and which is adapted to be depressed in the casing 13 by the plunger 21.

The driving shaft 10 and the driven shaft 11 are somewhat similar in shape, that is, each has an enlarged portion within the casing 13 which have projections upon their adjacent ends, though the enlarged portion 22 upon the shaft 10 is of greater length than the enlarged portion 23 upon the shaft 11 and as here shown there are two projections 24 for the shaft 11 and one projection 25 upon the shaft 10, though the number of projections is immaterial to this invention. The enlarged portion 22 extends through and has bearing in sleeve 17 of the casing and extends into the central opening 26 in the rotatable member 12.

The rotatable member 12 is somewhat disk like and is adapted to revolve within the casing 13 and bears centrally on one side against the sleeve 17 as before mentioned and the other side lies flush with the edge of the outer portion of the casing 13. Said member 12 has a central opening 26 of a diameter slightly greater than the diameter of the enlarged shaft portions 22 and 23 respectively and there is a radially extending hole 28 from the opening 27 to the periphery, the inner end being reduced to form a shoulder 29 through which a plunger 30 is adapted to extend with a cap 31 fitting within the enlarged portion of the hole 28 and with a spring 32 surrounding the plunger and bearing against the shoulder 29 and the cap 31, intending to force the plunger outward. The opposite sides of the inner end of the plunger 30 are inwardly tapered as shown in Figs. 2, 3, and 4 and when the plunger is forced inward against the action of the spring 32 the plunger will project across the opening between the projections 25 and 24 on the shafts 10 and 11 respectively, and as the driving shaft 10 rotates the projection 25 will engage said plunger 30 and through it the projection 24 of the shaft 11 and will cause the driving of said shaft.

For the purpose of depressing the plunger 30 the lever 20 before mentioned, is fulcrumed upon a pin 33 extending across a slot 34 at one side of the member 12 and carrying the roller 19 mounted upon a pin 36 and with the free end of the lever rounded to form an inward projection 37 adapted to bear within the U-shaped outer end of the cap 31. The action of the spring 32 tends to force the roller 19 against the casing 13 and as the member 12 is rotated, when said roller comes opposite the hole 18 in said casing the spring 32 will force said roller into said hole and the rotatable member will be stopped, the movement of the lever end 37 being sufficient to allow the spring 32 to withdraw the plunger 30 from engagement with the projections 24 and 25. The lever 20 carries projections 38 upon either side of the roller 19 which assists in stopping the rotation of the member 12 by engaging the edges of the opening 18 in the casing 13. The end 37 of the lever 20 lying within the U-shaped end of the cap 31 prevents the pin from turning in the hole 28 so that the tapered inner end of said pin is always in position for properly engaging projections 24 and 25.

The roller 19 upon the lever 20 is depressed by the plunger 21 for causing the operation of the clutch but the means for depressing said plunger is not shown in the drawings, as any convenient and suitable means may be used without departing from the spirit of this invention.

The shaft 10 runs constantly and when the parts are in the position shown in Fig. 3 the shaft 11 is not driven. By pushing down the plunger 21 the lever 20 is depressed and it forces the plunger 21 in between the flanges 10 and 11 and interlocks them for one revolution of the roller 19 coöperates with the internal surface of the casing and holds the lever 20 and flange 30 in an interlocking position. At the end of one revolution the spring 32 forces the plunger 30 radially outward and unlocks it. Such action is permitted by the roller 19 entering the hole 18 which pushes the lever 20 radially outward from the position in Fig. 2 to that in Fig. 3.

I claim as my invention:

1. Clutch mechanism including two rotatable members, one surrounding the other, a plunger mounted in the surrounding member radially moved into clutching engagement with the other member, a spring for withholding said plunger and means in said surrounding member for actuating the plunger.

2. Clutch mechanism including a rotatable member, a driving element, a driven element, said two elements mounted adjacent to each other in said rotatable member and means movable radially in said rotatable member into engagement with said two elements for clutching them together.

3. Clutch mechanism including a rotatable member, a driving element, a driven element, said two elements mounted in said rotatable element and with adjacent projections, and means in said rotatable member movable radially into position between said two elements for engaging the projections thereon and clutching them together.

4. Clutch mechanism including a rotatable member, a driving element, a driven element, said two elements mounted in said rotatable member and means in said rotatable member movable radially into position between said two elements for engaging the projections thereon and clutching them together.

5. Clutch mechanism including a rotatable member, a driving element, a driven element, said two elements being mounted in said rotatable member adjacent to each other, a plunger mounted in said rotatable member so as to be radially movable into clutching engagement with said two elements, and means for actuating said plunger.

6. Clutch mechanism including a rotatable member, a driving element, a driven element, said two elements being mounted in said rotatable member adjacent to each other, a plunger mounted in said member so as to be radially movable into clutching engagement with said two elements, a lever mounted in said member for actuating said plunger, and means for operating said lever.

7. Clutch mechanism including a fixed casing having a peripheral opening therethrough, a rotatable member in said casing, a driving element, a driven element, the ends of said driving and driven elements lying in fixed longitudinal relation and each carrying a projection on their adjacent ends, a spring withheld plunger in said rotatable member with one end adapted to extend into engagement with said projections on said driving and driven elements, a lever fulcrumed on said rotatable member with one end thereof engaging the outer end of said plunger, means on said lever adapted to extend into the peripheral opening in said casing, and means for pressing said projection within said casing whereby said plunger will be engaged by the projection on the end of the driving element and will engage the projection on the end of the driven element and said driven element will rotate with said driving element during one revolution of the latter.

8. Clutch mechanism including a fixed casing having a peripheral opening therethrough, a rotatable member in said casing, a driving element, a driven element, the ends of said driving and driven elements lying in fixed longitudinal relation and each carrying a projection on their adjacent ends, a spring withheld plunger in said rotatable member with one end adapted to extend into engagement with said projections on said driving and driven elements, a lever fulcrumed on said rotatable member with one end thereof engaging the outer end of said plunger, a projection on said lever adapted to extend into the peripheral opening in said casing, a roller adjacent to said projection adapted to extend into said casing opening when in inoperative position and to engage the inner surface of said casing when operated, and a plunger adapted to extend into said casing opening for depressing said roller within said casing thereby moving said plunger into the path of the projection on the end of said driving element and causing said driven element to rotate with said driving element.

In witness whereof, I have hereunto affixed my signature in the presence of the witnesses herein named.

FRANK G. RATHSAM.

Witnesses:
J. H. WELLS,
E. H. MAYO.

Copies of this patent may be obtained for five cents each, by addressing the "Commissioner of Patents, Washington, D. C."